(12) United States Patent
Nomura et al.

(10) Patent No.: US 10,377,885 B2
(45) Date of Patent: Aug. 13, 2019

(54) VULCANIZATION-BONDED LAMINATE, AND RUBBER COMPOSITION USED THEREFOR

(71) Applicant: NICHIRIN CO., LTD., Kobe-shi, Hyogo (JP)

(72) Inventors: Takaaki Nomura, Himeji (JP); Shinji Higashika, Himeji (JP)

(73) Assignee: NICHIRIN CO., LTD., Kobe-Shi (JP)

( * ) Notice: Subject to any disclaimer, the term of this patent is extended or adjusted under 35 U.S.C. 154(b) by 341 days.

(21) Appl. No.: 15/100,254

(22) PCT Filed: Sep. 2, 2014

(86) PCT No.: PCT/JP2014/073016
§ 371 (c)(1),
(2) Date: May 27, 2016

(87) PCT Pub. No.: WO2015/098186
PCT Pub. Date: Jul. 2, 2015

(65) Prior Publication Data
US 2016/0369090 A1    Dec. 22, 2016

(30) Foreign Application Priority Data

Dec. 24, 2013    (JP) .................................. 2013-264971

(51) Int. Cl.
*C08L 19/00*    (2006.01)
*B32B 25/14*    (2006.01)
(Continued)

(52) U.S. Cl.
CPC ................ *C08L 19/00* (2013.01); *B32B 1/08* (2013.01); *B32B 25/042* (2013.01); *B32B 25/14* (2013.01);
(Continued)

(58) Field of Classification Search
CPC ........... C08L 19/00; C08L 71/03; F16L 11/04; B32B 25/16; B32B 25/042; B32B 25/14;
(Continued)

(56) References Cited

U.S. PATENT DOCUMENTS 6,340,511 B1 * 1/2002 Kanbe ...................... B32B 1/08
428/36.91

FOREIGN PATENT DOCUMENTS

| CN | 103073872 A | 5/2013 |
| EP | 1704994 A1 | 9/2006 |

(Continued)

OTHER PUBLICATIONS

Extended European Search Report (EESR) dated Jul. 20, 2017, issued for European counterpart patent application No. EP14873652.
(Continued)

*Primary Examiner* — James C Yager
(74) *Attorney, Agent, or Firm* — Law Office of Katsuhiro Arai

(57) ABSTRACT

Provide a laminate constituted by epichlorohydrin rubber layer and fluororubber layer that are strongly vulcanization-bonded together. A rubber laminate constituted by vulcanization-bonding an epichlorohydrin rubber layer that contains at least (a) magnesium oxide, (b) polythiol vulcanizing agent, (c) at least one type of compound selected from 1,8-diazabicyclo (5,4,0) undecene-7,1,5-diazabicyclo (4,3,0) nonene-5, and salts thereof, (d) at least one type of compound selected from organic phosphonium salts and organic ammonium salts, and (e) maleic anhydride modified polybutadiene, and a fluororubber layer; wherein such rubber laminate is characterized in that: the content of the polythiol vulcanizing agent (b) in the epichlorohydrin rubber layer is 0.3 to 1.2 parts by weight per 100 parts by weight of the epichlorohydrin rubber; and the content of the maleic
(Continued)

anhydride modified polybutadiene (e) in the epichlorohydrin rubber layer is 0.3 to 1.5 parts by weight per 100 parts by weight of the epichlorohydrin rubber.

2 Claims, 1 Drawing Sheet

(51) Int. Cl.
*B32B 1/08* (2006.01)
*B32B 25/04* (2006.01)
*B32B 25/16* (2006.01)
*F16L 11/04* (2006.01)
*C08L 71/03* (2006.01)

(52) U.S. Cl.
CPC .............. *B32B 25/16* (2013.01); *C08L 71/03* (2013.01); *F16L 11/04* (2013.01); *B32B 2250/02* (2013.01); *B32B 2250/248* (2013.01); *B32B 2307/3065* (2013.01); *B32B 2307/56* (2013.01); *B32B 2597/00* (2013.01)

(58) Field of Classification Search
CPC ... B32B 1/08; B32B 2250/02; B32B 2307/56; B32B 2307/3065; B32B 2597/00; B32B 2250/248
See application file for complete search history.

(56) References Cited

FOREIGN PATENT DOCUMENTS

| | | | |
|---|---|---|---|
| EP | 2551106 A1 | 1/2013 |
| JP | H04372652 A | 12/1992 |
| JP | H1088076 A | 4/1998 |
| JP | 2006272739 A | 10/2006 |
| JP | 2008265273 A | 11/2008 |
| JP | 2011005719 A | 1/2011 |
| JP | 2011201074 A | 10/2011 |
| JP | 2012051348 A | 3/2012 |
| JP | 2012061644 A | 3/2012 |
| JP | 2012081682 A | 4/2012 |
| JP | 2013043400 A | 3/2013 |

OTHER PUBLICATIONS

International Search Report (ISR) dated Dec. 2, 2014, issued for International application No. PCT/JP2014/073016.
A First Office Action issued by the State Intellectual Property Office of China dated Nov. 23, 2017 for Chinese counterpart application No. 201480065475.7.
Notification Concerning Transmittal of International Preliminary Report on Patentability (PCT/IB326) and Notification of Transmittal of Translation of the International Preliminary Report on Patentability (PCT/IB/338) dated Jul. 7, 2016, with International Preliminary Report on Patentability (PCT/IB/373) and Written Opinion of the International Searching Authority (PCT/ISA/237), for corresponding international application PCT/JP2014/073016.
A verified translation of Tables 1 to 3 (paragraphs [0029] to [0031]) by Applicant disclosed in Japanese Patent Publication No. 2011-201074.

* cited by examiner

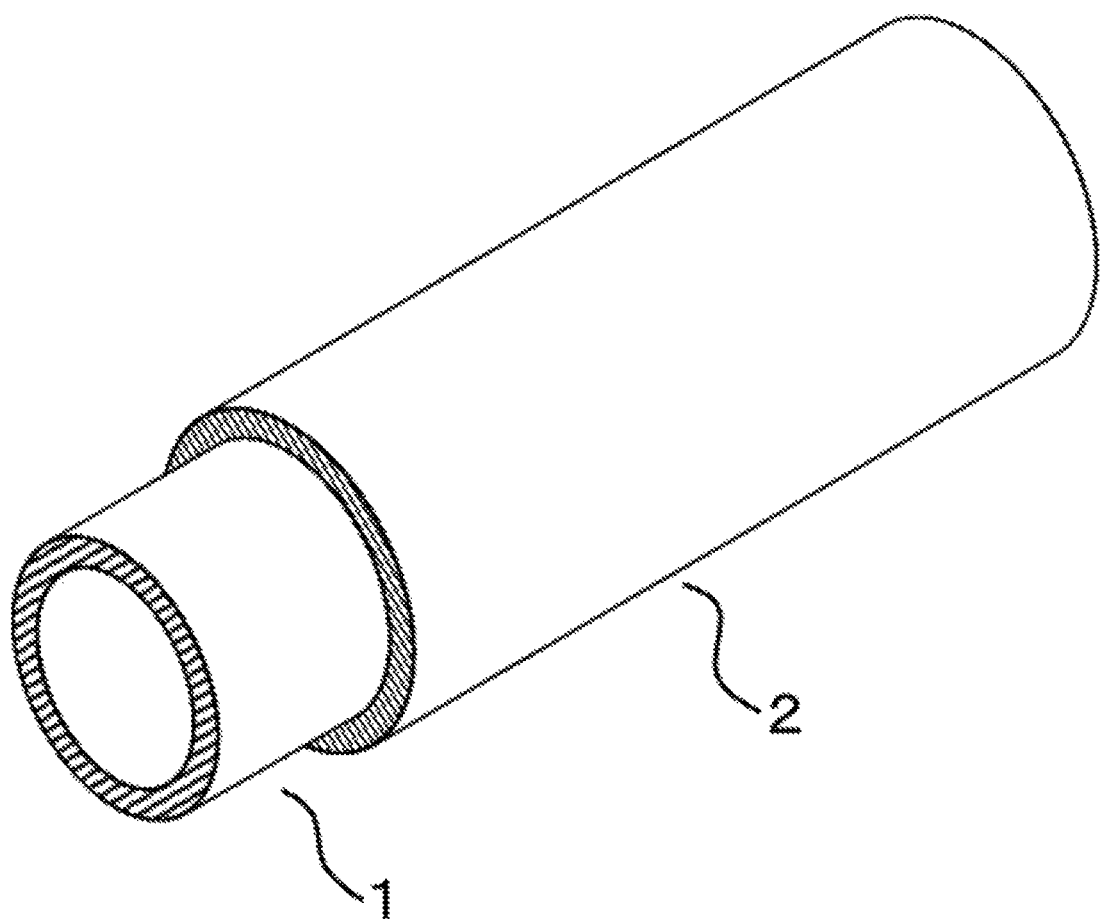

US 10,377,885 B2

VULCANIZATION-BONDED LAMINATE, AND RUBBER COMPOSITION USED THEREFOR

TECHNICAL FIELD

The present invention relates to a vulcanization-bonded laminate constituted by epichlorohydrin rubber layer and fluororubber layer, as well as an epichlorohydrin rubber composition used for such laminate.

BACKGROUND ART

Fluororubber is drawing attention as a material for fuel hoses, etc., for its excellent heat resistance, oil resistance, ozone resistance, chemical resistance, etc., but it is expensive. Accordingly, a laminate structure of fluororubber and epichlorohydrin rubber is used to retain oil resistance as well as flexibility, while reducing the usage of fluororubber, with the fluororubber placed on the side contacting the oil medium.

However, fluorine is a material with low surface energy that does not bond easily with other polymers, and therefore an additive must be compounded to epichlorohydrin rubber to improve adhesiveness. For this additive, 1,8-diazabicyclo (5,4,0) undecene-7 salt (Patent Literatures 1 and 2), polyether compound whose number-averaged molecular weight is 1000 or more (Patent Literature 3), strongly basic compound having an amidine skeleton in its molecule, combined with epoxy resin (Patent Literature 4), and 1,8-diazabicyclo (5,4,0) undecene-7 salt, etc., combined with magnesium oxide, silica, epoxy resin (Patent Literature 5), have been proposed. Epichlorohydrin rubber compounded with any such additive can be vulcanization-bonded directly to fluororubber; however, the scorching time becomes shorter and burning occurs easily during kneading, storage, and molding, and the workability drops as a result. In other words, adhesiveness and workability are two properties that are difficult to achieve at the same time, when it comes to rubber compositions.

In Patent Literature 6, adding 1,8-diazabicyclo (5,4,0) undecene-7, etc., epoxy resin, water-supporting substance to improve adhesiveness, and further compounding N-cyclohexyl thio phthalimide and/or nickel dibutyl dithio carbamate as an anti-scorching agent is proposed. However, since the epoxy resin starts polymerizing with the 1,8-diazabicyclo (5,4,0) undecene-7, etc., which is a strong base, functioning as a curing accelerator, a satisfactory scorching time cannot be achieved even though an anti-scorching agent has been compounded.

On the other hand, various methods have been attempted to improve adhesiveness by treating the surface of a fluorine member, and a method of vulcanization-bonding a fluororesin layer whose surface has been plasma-treated, with epichlorohydrin rubber, has been proposed (Patent Literature 7).

Additionally, Patent Literature 8 permits vulcanization-bonding of NBR or other synthetic rubber with fluororubber using an additive that does not cause scorching easily. This additive can be used in epichlorohydrin rubber so that it can be vulcanization-bonded with fluororubber; however, high levels of adhesiveness and workability cannot be achieved at the same time.

BACKGROUND ART LITERATURE

Patent Literature

[Patent Literature 1] Japanese Patent Laid-open No. Hei 10-88076
[Patent Literature 2] Japanese Patent Laid-open No. 2011-5719
[Patent Literature 3] Japanese Patent Laid-open No. 2012-51348
[Patent Literature 4] Japanese Patent Laid-open No. 2012-81682
[Patent Literature 5] Japanese Patent Laid-open No. 2012-61644
[Patent Literature 6] Japanese Patent Laid-open No. 2013-43400
[Patent Literature 7] Japanese Patent Laid-open No. 2006-272739
[Patent Literature 8] Japanese Patent Laid-open No. 2011-201074

SUMMARY OF THE INVENTION

Problems to be Solved by the Invention

The present invention provides a vulcanization-bonded laminate constituted by epichlorohydrin rubber layer and fluororubber layer that are strongly vulcanization-bonded together, as well as an epichlorohydrin rubber composition offering adhesiveness and workability at the same time.

Means for Solving the Problems

Key constitutions of the present invention to solve the aforementioned problems are as follows:
1. A rubber laminate constituted by vulcanization-bonding an epichlorohydrin rubber layer that contains at least (a) magnesium oxide, (b) polythiol vulcanizing agent, (c) at least one type of compound selected from 1,8-diazabicyclo (5,4,0) undecene-7 (hereinafter abbreviated as "DBU"), 1,5-diazabicyclo (4,3,0) nonene-5 (hereinafter abbreviated as "DBN"), and salts thereof, (d) at least one type of compound selected from organic phosphonium salts and organic ammonium salts, and (e) maleic anhydride modified polybutadiene, and a fluororubber layer; wherein the content of the polythiol vulcanizing agent (b) in the epichlorohydrin rubber layer is 0.3 to 1.2 parts by weight per 100 parts by weight of the epichlorohydrin rubber, and the content of the maleic anhydride modified polybutadiene (e) in the epichlorohydrin rubber layer is 0.3 to 1.5 parts by weight per 100 parts by weight of the epichlorohydrin rubber.
2. A rubber laminate according to 1, wherein the fluororubber layer is fluororubber that contains polyol vulcanizing agent.
3. A flexible hose made of a rubber laminate according to 1.
4. A flexible hose made of a rubber laminate according to 2.
5. An epichlorohydrin rubber composition containing at least (a) magnesium oxide, (b) polythiol vulcanizing agent, (c) at least one type of compound selected from 1,8-diazabicyclo (5,4,0) undecene-7,1,5-diazabicyclo (4,3,0) nonene-5, and salts thereof, (d) at least one type of compound selected from organic phosphonium salts and organic ammonium salts, and (e) maleic anhydride modified polybutadiene; wherein the content of the polythiol vulcanizing agent (b) is 0.3 to 1.2 parts by weight per 100 parts by weight of the epichlorohydrin rubber, and the content of the maleic anhydride modified polybutadiene (e) is 0.3 to 1.5 parts by weight per 100 parts by weight of the epichlorohydrin rubber.

Effects of the Invention

According to the present invention, a laminate constituted by epichlorohydrin rubber layer and fluororubber layer that are strongly vulcanization-bonded together was obtained. Applications of such laminate include, among others, fuel hoses utilizing the properties of fluororubber fully. Also, the epichlorohydrin rubber composition used in the laminate has excellent adhesive force, and can be strongly vulcanization-bonded with fluororubber and various other rubber compositions. In addition, the long scorching time and excellent ease of handling, and resistance to burning during kneading, storage, and molding, make this laminate very advantageous in terms of manufacturing cost.

BRIEF DESCRIPTION OF THE DRAWINGS

FIG. 1 A double-layer structure hose using fluororubber for the inner side and epichlorohydrin rubber for the outer side.

DESCRIPTION OF THE SYMBOLS

1. Inner layer made of fluororubber
2. Outer layer made of epichlorohydrin rubber

MODE FOR CARRYING OUT THE INVENTION

The present invention is explained in detail below.

The present invention is a laminate constituted by vulcanization-bonding an epichlorohydrin rubber layer that contains at least (a) magnesium oxide, (b) polythiol vulcanizing agent, (c) at least one type of compound selected from DBU, DBN, and salts thereof, (d) at least one type of compound selected from organic phosphonium salts and organic ammonium salts, and (e) maleic anhydride modified polybutadiene, and a fluororubber layer; wherein the content of the polythiol vulcanizing agent (b) in the epichlorohydrin rubber layer is 0.3 to 1.2 parts by weight per 100 parts by weight of the epichlorohydrin rubber, and the content of the maleic anhydride modified polybutadiene (e) in the epichlorohydrin rubber layer is 0.3 to 1.5 parts by weight per 100 parts by weight of the epichlorohydrin rubber, as well as an epichlorohydrin rubber composition used for such laminate.

[Fluororubber]

The fluororubber used under the present invention is not limited in any way, and a copolymer of fluorine-containing monomers or copolymer of fluorine-containing monomers and hydrocarbon monomers may be used.

Examples of fluorine-containing monomers include: vinylidene fluoride, trifluoroethylene, trifluorochloroethylene, tetrafluoroethylene, vinyl fluoride, and other fluoroethylenes; hexafluoropropene, pentafluoropropene, and other fluoropropylenes; and perfluoro (methyl vinyl ether), perfluoro (propyl vinyl ether), and other perfluoro (alkyl vinyl ethers), among others. One type of fluorine monomer may be used alone, or two or more types may be combined.

Examples of hydrocarbon monomers include: ethylene, propylene, and other olefins; methyl vinyl ether, ethyl vinyl ether, and other vinyl ethers; vinyl acetate and other vinyl esters; methyl acrylate and other acrylic acid esters, among others. One type of hydrocarbon monomer may be used alone, or two or more types may be combined.

Also, under the present invention, the fluororubber may use a copolymer produced by copolymerizing the aforementioned fluorine monomers and hydrocarbon monomers as well as small quantities of other monomers to be vulcanized. Other monomers include: monomers containing 2-iodo perfluoropropene, 4-iodo fluorobutene-1, and other iodine atoms; and monomers containing bromotrifluoroethylene, 4-bromo-3,3,4,4-tetrafluorobutene-1 and other bromine atoms, among others.

Preferably, specific examples of the fluororubber under the present invention include vinylidene fluoride-hexafluoropropylene copolymer, vinylidene fluoride-hexafluoropropylene-tetrafluoroethylene copolymer, tetrafluoroethylene-propylene copolymer, and tetrafluoroethylene-vinylidene fluoride-propylene copolymer, among others. One type of fluororubber may be used alone, or two or more types may be combined.

Vulcanizing agents for fluororubber include polyamine vulcanizing agent, peroxide vulcanizing agent, and polyol vulcanizing agent, of which polyol vulcanizing agent is preferred. Fluororubber containing polyamine vulcanizing agent has excellent adhesiveness, but its high Mooney viscosity is not suitable for extrusion molding. Fluororubber containing peroxide vulcanizing agent has excellent adhesiveness, but it is expensive. Epichlorohydrin rubber containing the additives of the present invention has excellent adhesiveness and can also be vulcanization-bonded strongly with fluororubber containing polyol vulcanizing agent.

Any known compounding agents that are normally added, such as filler, softener, plasticizer, anti-aging agent, stabilizer, and processing aids, may be added as deemed appropriate to the fluororubber of the present invention.

[Epichlorohydrin Rubber]

The epichlorohydrin rubber used under the present invention is preferably at least one type of polymer selected from a group that includes, for example, epichlorohydrin homopolymer, epichlorohydrin-ethylene oxide copolymer, epichlorohydrin-allyl glycidyl ether copolymer, epichlorohydrin-ethylene oxide-allyl glycidyl ether copolymer, epichlorohydrin-propylene oxide copolymer, epichlorohydrin-propylene oxide-allyl glycidyl ether copolymer, and epichlorohydrin-ethylene oxide-propylene oxide-allyl glycidyl ether quarterpolymer. More preferably it is at least one type of polymer selected from epichlorohydrin-ethylene oxide copolymer, and epichlorohydrin-ethylene oxide-allyl glycidyl ether copolymer. One type of epichlorohydrin rubber may be used alone, or two or more types may be combined.

[(a) Magnesium Oxide]

Magnesium oxide acts as acid acceptor and increases adhesiveness further. The laminate proposed by the present invention exhibits excellent adhesiveness by requiring that the epichlorohydrin rubber contain magnesium oxide.

[(b) Polythiol Vulcanizing Agent]

Polythiol vulcanizing agent is a compound having two or more thiol groups in its molecule, or a derivative of such compound, and examples include: 2,5-dimercapto-1,3,4-thiadiazole, 2,5-dimercapto-1,3,4-thiadiazole-5-thiobenzoate, and other thiadiazole vulcanizing agents; 1,2-diazine-3,6-dithiol, 1,3-diazine-2,5-dithiol, 1,4-diazine-2,3-dithiol, 6-methyl amino-1,4-diazine-2,3-dithiol, S,S-6-methyl quinoxaline-2,3-diyl dithio carbonate, and other diazine thiol vulcanizing agents; 2,4,6-trimercapto-1,3,5-triazine, 1-hexyl amino-3,5-dimercaptotriazine, 1-dibutyl amino-3,5-dimercaptotriazine, 1-phenyl amino-3,5-dimercaptotriazine, and other triazine vulcanizing agents; quinoxaline-2,3-dithio carbonate, 6-methyl quinoxaline-2,3-dithio carbonate, 5,6-dimethyl quinoxaline-2,3-dithio carbonate, and other quinoxaline vulcanizing agents; and pyrazine-2,3-dithio carbonate, 5-methyl-2,3-dimercaptopyrazine, 5,6-dimethyl-2,3-dimercaptopyrazine, 5-methyl pyrazine-2,3-dithio carbonate, and other pyrazine vulcanizing agents, among others. One type of polythiol vulcanizing agent may be used alone, or two or more types may be combined.

The content of polythiol vulcanizing agent is preferably 0.3 to 1.2 parts by weight, or more preferably 0.3 to 0.6 part by weight, per 100 parts by weight of epichlorohydrin rubber. If the content is less than 0.3 part by weight, the adhesiveness with respect to fluororubber weakens; if the content exceeds 1.2 parts by weight, on the other hand, the scorching time becomes shorter.

[(c) At Least One Type of Compound Selected from DBU, DBN, and Salts Thereof]

The DBU salt or DBN salt to be used is not limited in any way so long as it improves the adhesiveness of epichlorohydrin rubber. To be specific, the DBU salt may be DBU-carbonic acid salt, DBU-stearic acid salt, DBU-benzoic acid salt, DBU-phenolic resin salt, DBU-toluene sulfonic acid salt, or the like, while the DBN salt may be DBN-carbonic acid salt, DBN-stearic acid salt, DBN-benzoic acid salt, DBN-phenolic resin salt, DBN-toluene sulfonic acid salt, or the like.

Among these, DBU-phenolic resin salt is preferred.

[(d) At Least One Type of Compound Selected from Organic Phosphonium Salts and Organic Ammonium Salts]

The organic phosphonium salt or organic ammonium salt to be used is not limited in any way so long as it improves the adhesiveness of epichlorohydrin rubber. To be specific, the organic phosphonium salt may be tetrabutyl phosphonium salt, tetraoctyl phosphonium salt, methyl trioctyl phosphonium salt, butyl trioctyl phosphonium salt, phenyl tributyl phosphonium salt, benzyl tributyl phosphonium salt, benzyl tricyclohexyl phosphonium salt, benzyl trioctyl phosphonium salt, butyl triphenyl phosphonium salt, octyl triphenyl phosphonium salt, benzyl triphenyl phosphonium salt, or tetraphenyl phosphonium salt, among others. The organic ammonium salt may be trimethyl octyl ammonium chloride, triethyl benzyl ammonium chloride, tetrabutyl ammonium chloride, tetrabutyl ammonium bromide, tetraethyl ammonium bromide, benzyl tributyl ammonium chloride, tetrabutyl ammonium hydrogen sulfate, or tetrabutyl ammonium hydroxide, among others.

Among these, tetrabutyl phosphonium salt is preferred.

[(e) Maleic Anhydride Modified Polybutadiene]

Maleic anhydride modified polybutadiene is a type of rubber into which acid has been introduced through direct reaction between dissolved maleic anhydride and liquid polybutadiene, and is used as an internal adhesive component under the present invention.

Maleic anhydride modified polybutadiene is an adhesiveness-adding agent whose side effect of shortening the scorching time is weaker than that of DBU, DBU salt, DBN, DBN salt, organic phosphonium salt, or organic ammonium salt.

The content of maleic anhydride modified polybutadiene is preferably 0.3 to 1.5 parts by weight, or more preferably 0.3 to 1.0 part by weight, or even more preferably 0.3 to 0.7 part by weight, per 100 parts by weight of epichlorohydrin rubber. If the content is 0.3 part by weight or less, sufficient adhesiveness cannot be achieved; if the content is 1.5 parts by weight or more, on the other hand, the scorching time becomes shorter and ease of handling drops.

Under the present invention, all of the aforementioned five types of compounding agents are essential to the epichlorohydrin rubber composition. In particular, an epichlorohydrin rubber composition offering excellent adhesiveness as well as resistance to burning during kneading, storage, and molding can be obtained without increasing the contents of other compounding agents, by containing maleic anhydride modified polybutadiene.

In addition to the above, the epichlorohydrin rubber composition can contain any known compounding agents that are normally contained, such as carbon black, filler, softener, plasticizer, anti-aging agent, stabilizer, and processing aids as deemed appropriate.

Under the present invention, the scorching time t5 (L-type rotor, 125° C.) of the epichlorohydrin rubber composition before vulcanization is preferably 10 minutes or more, or more preferably 12 minutes or more, from the viewpoint of workability. The epichlorohydrin rubber composition proposed by the present invention has excellent adhesiveness and thus can be strongly vulcanization-bonded not only with fluororubber, but also with other types of rubber.

[Method of Manufacturing Vulcanization-Bonded Laminate]

For the method of manufacturing the vulcanization-bonded laminate proposed by the present invention, any known method may be used without limitation. Examples include: a method whereby a layer constituted by fluororubber is extruded together with a layer constituted by epichlorohydrin rubber, followed by vulcanization; a method whereby a layer constituted by one rubber is formed, after which a cover layer constituted by the other rubber is formed, followed by vulcanization; and a method whereby a layer of one rubber is vulcanized, after which a layer of the other rubber is stacked on top, followed by vulcanization of the other layer, among others.

If the vulcanization-bonded laminate proposed by the present invention is a hose, a method whereby a mandrel is covered with an unvulcanized laminate and the laminate is vulcanized can be adopted in addition to the aforementioned methods.

[Applications of Vulcanization-Bonded Laminate]

The vulcanization-bonded laminate proposed by the present invention can be used in various applications, such as various flexible hoses including fuel hoses, hoses for transporting alcohol, oil, etc., hoses for transferring air containing oil droplets, etc., and hoses for transferring mineral oil, LP gas, natural gas or other hydrocarbon-containing liquid or gas, as well as containers for storing the foregoing fluids, and industrial belts, buffer materials, gaskets, oil seals, vibration-damping materials, sheets, boots, and other mechanical parts, facility parts, construction parts, system components, etc., that come in contact with the foregoing fluids.

A flexible hose constituted by the vulcanization-bonded laminate proposed by the present invention may be a double-layer structure hose having an inner layer 1 of fluororubber and an outer layer 2 of epichlorohydrin rubber, as shown in FIG. 1, for example. A fluororubber layer is formed on the inner surface of the hose that comes in contact with fuel, alcohol, LP gas, or other lipophilic compound-containing substance being transferred, and an epichlorohydrin rubber layer is formed on the outer side of the hose. In the case of laminates other than flexible hoses, a fluororubber layer is also formed on their surface that comes in contact with fuel, alcohol, LP gas, etc.

Also, the present invention is not limited to a double-layer structure laminate, and the laminate may have other layer or layers so long as the epichlorohydrin rubber layer and fluororubber layer are vulcanization-bonded directly. To be specific, a laminate of fluororubber layer/epichlorohydrin rubber layer/fluororubber layer structure, and a laminate of fluororubber layer/epichlorohydrin rubber layer/fiber reinforced layer/outer cover layer structure, are also included in the scope of the present invention.

Next, the present invention is explained more specifically below based on examples; it should be noted, however, that the present invention is not limited to these examples.

Examples

The respective components were compounded by the quantities shown in Table 1 and the mixture was kneaded using a kneader to obtain a fluororubber composition. From this fluororubber composition, a fluororubber sheet of 2 mm in thickness was prepared using an 8-inch roll.

TABLE 1

| Rubber composition | Fluororubber | 100 |
|---|---|---|
| | Carbon black | 15 |
| | Calcium hydroxide | 6 |
| | Magnesium oxide | 3 |

Fluororubber: DAI-EL G558 (polyol vulcanizing agent manufactured by Daikin Industries, Ltd.)
Carbon black: SEAST S (manufactured by Tokai Carbon Co., Ltd.)
Calcium hydroxide: CALDIC #2000 (manufactured by Ohmi Chemical Industry Co., Ltd.)
Magnesium oxide: MgO #150 (manufactured by Kyowa Chemical Industry Co., Ltd.)

The respective components were compounded by the quantities shown in Tables 2 and 3, and each mixture was kneaded using a kneader to obtain an epichlorohydrin rubber composition. From this epichlorohydrin rubber composition, an epichlorohydrin rubber sheet of 2 mm in thickness was prepared using an 8-inch roll.

TABLE 2

| | | Example | | | | | |
|---|---|---|---|---|---|---|---|
| | | 1 | 2 | 3 | 4 | 5 | 6 |
| Rubber composition | Epichlorohydrin rubber | 100 | 100 | 100 | 100 | 100 | 100 |
| | Carbon black | 60 | 60 | 60 | 60 | 60 | 60 |
| | Calcium carbonate | 20 | 20 | 20 | 20 | 20 | 20 |
| | Plasticizer | 7 | 7 | 7 | 7 | 7 | 7 |
| | Acid acceptor | 5 | 5 | 5 | 5 | 5 | 5 |
| | Magnesium oxide | 2.0 | 2.0 | 2.0 | 2.0 | 2.0 | 2.0 |
| | Polythiol vulcanizing agent | 0.6 | 0.6 | 0.6 | 0.6 | 0.3 | 1.2 |
| | DBU-phenol resin salt | 1.2 | 1.2 | 1.2 | 1.2 | 1.2 | 1.2 |
| | Organic phosphonium salt | 1.2 | 1.2 | 1.2 | 1.2 | 1.2 | 1.2 |
| | Maleic anhydride modified polybutadiene | 0.3 | 0.7 | 1.0 | 1.5 | 0.7 | 0.7 |

TABLE 3

| | | Comparative Example | | | | | | |
|---|---|---|---|---|---|---|---|---|
| | | 1 | 2 | 3 | 4 | 5 | 6 | 7 |
| Rubber composition | Epichlorohydrin rubber | 100 | 100 | 100 | 100 | 100 | 100 | 100 |
| | Carbon black | 60 | 60 | 60 | 60 | 60 | 60 | 60 |
| | Calcium carbonate | 20 | 20 | 20 | 20 | 20 | 20 | 20 |
| | Plasticizer | 7 | 7 | 7 | 7 | 7 | 7 | 7 |
| | Acid acceptor | 5 | 5 | 5 | 5 | 5 | 5 | 5 |
| | Magnesium oxide | 2.0 | 2.0 | 2.0 | 2.0 | 0 | 2.0 | 2.0 |
| | Polythiol vulcanizing agent | 0.6 | 0.6 | 0.6 | 0 | 0.6 | 0.6 | 1.5 |
| | DBU-phenol resin salt | 1.2 | 1.2 | 0 | 1.2 | 1.2 | 1.2 | 1.2 |
| | Organic phosphonium salt | 1.2 | 0 | 1.2 | 1.2 | 1.2 | 1.2 | 1.2 |
| | Maleic anhydride modified polybutadiene | 0 | 0.7 | 0.7 | 0.7 | 0.7 | 2.0 | 0.7 |

Epichlorohydrin rubber: EPICHLOMER C (manufactured by Daiso Co., Ltd.)
Carbon black: ASAHI #60G (manufactured by Asahi Carbon Co., Ltd.)
Calcium carbonate: SUPER S (manufactured by Maruo Calcium Co., Ltd.)
Plasticizer: Adipic acid bis [2-(2-buthoxy ethoxy) ethyl]
Acid acceptor: DHT-4A (manufactured by Kyowa Chemical Industry Co., Ltd.)
Magnesium oxide: KYOWA MAG 150 (manufactured by Kyowa Chemical Industry Co., Ltd.)
Polythiol vulcanizing agent: DAISONET XL-21S (manufactured by Daiso Co., Ltd.)
DBU-phenol resin salt: P-152 (manufactured by Daiso Co., Ltd.)
Organic phosphonium salt: Dynamar FX-5166 (manufactured by 3M Company)
Maleic anhydride modified polybutadiene: Ricobond 1753 HS (manufactured by Cray Valley)

An epichlorohydrin rubber composition containing the five types of compounding agents used in Patent Literature 8 (Japanese Patent Laid-open No. 2011-201074) as mentioned above by the quantities shown in Table 4, was obtained as a comparative example. From this epichlorohydrin rubber composition, an epichlorohydrin rubber sheet of 2 mm in thickness was prepared using an 8-inch roll.

TABLE 4

| | | Comparative Example | |
|---|---|---|---|
| | | 8 | 9 |
| Rubber composition | Epichlorohydrin rubber | 6100 | 100 |
| | Carbon black | 0 | 60 |
| | Calcium carbonate | 20 | 20 |
| | Plasticizer | 7 | 7 |
| | Acid acceptor | 5 | 5 |
| | Magnesium oxide | 10 | 3 |
| | Organic peroxide | 1.0 | 0.5 |

TABLE 4-continued

|  | Comparative Example | |
|---|---|---|
|  | 8 | 9 |
| Silica | 20 | 5 |
| Organic phosphonium salt | 2.0 | 0.5 |
| Maleic anhydride modified polybutadiene | 1 | 1 |

Organic peroxide: Perbutyl P (manufactured by NOF Corporation)
Silica: Hi-Sil 233 (manufactured by PPG Industries)
Organic phosphonium salt: ZEONET PB (manufactured by Nippon Chemical Industrial Co., Ltd.)
Maleic anhydride modified polybutadiene: Ricobond 1756 (manufactured by Cray Valley)

The unvulcanized fluororubber sheet of 2 mm in thickness and unvulcanized epichlorohydrin rubber sheet of 2 mm in thickness, as obtained above, were pressed at 100° C. for 5 minutes as pretreatment, and then steam-vulcanized at 160° C. for 30 minutes to prepare a test piece constituted by a vulcanization-bonded laminate of epichlorohydrin rubber layer and fluororubber layer.

[Evaluation of Physical Properties]

Physical properties of the epichlorohydrin rubber compositions and vulcanization-bonded laminates in the examples and comparative examples were measured. The measured results are shown in Table 5 below.

TABLE 5

| Example | Scorching time/min | Workability | Adhesiveness Judgment | Strength/N/cm |
|---|---|---|---|---|
| Example 1 | 12.5 | ○ | ○ | 36 |
| Example 2 | 12.1 | ○ | ○ | 38 |
| Example 3 | 11.5 | ○ | ○ | 39 |
| Example 4 | 10.7 | ○ | ○ | 40 |
| Example 5 | 13.8 | ○ | ○ | 35 |
| Example 6 | 10.25 | ○ | ○ | 39 |
| Comparative Example 1 | 12.8 | ○ | Δ | 31 |
| Comparative Example 2 | 15.7 | ○ | X | 18 |
| Comparative Example 3 | 18.5 | ○ | X | 22 |
| Comparative Example 4 | 20 or more | ○ | X | 13 |
| Comparative Example 5 | 20 or more | ○ | X | 16 |
| Comparative Example 6 | 9.7 | Δ | ○ | 41 |
| Comparative Example 7 | 8.9 | Δ | ○ | 41 |
| Comparative Example 8 | 12.5 | X | ○ | 39 |
| Comparative Example 9 | 14.3 | ○ | X | 24 |

(Evaluation of Scorching Property)

The scorching time t5 (L-type rotor, 125° C.) of each kneaded but unvulcanized epichlorohydrin rubber composition was measured according to the method described in JIS K6300-1.

(Evaluation of Workability)

The unvulcanized epichlorohydrin rubber sheet and unvulcanized fluororubber sheet were pressed and vulcanization-bonded together, and then the ease of removing the laminate from the press, or workability, was evaluated based on the criteria below:
○: The press and laminate were not adhered together and the rubber sheets could be removed with ease.
Δ: The press and laminate were adhered together, but the rubber sheets could be removed.
x: The press and laminate were adhered together and the rubber sheets could not be removed.

(Evaluation of Adhesiveness)

A test piece of 25 mm in width and 100 mm in length was cut out from the vulcanization-bonded laminate. This test piece was set on a tensile tester and its adhesiveness was evaluated based on the criteria below according to the condition of delamination between the epichlorohydrin rubber layer and fluororubber layer at their interface. The delamination test was conducted by pulling the test piece with the tensile tester (Autograph manufactured by Shimadzu Corporation) at a speed of 25 mm per minute at room temperature:
○: The rubber underwent total cohesive failure.
Δ: The rubber exhibited partial interfacial delamination.
x: The rubber exhibited total interfacial delamination.

[Summary]

The vulcanization-bonded laminates conforming to the present invention, as obtained in Examples 1 to 6, underwent total cohesive failure of rubber in the delamination test, and demonstrated excellent adhesiveness between the two layers. Also, the unvulcanized epichlorohydrin rubber compositions conforming to the present invention, as used in Examples 1 to 6, had a practical scorching time of 10 minutes or more and demonstrated excellent workability without adhering to the press.

The epichlorohydrin rubber compositions in which one of the required compounding agents under the present invention was not added, as used in Comparative Examples 1 to 5, had a long scorching time as well as good workability. However, these epichlorohydrin rubber compositions did not vulcanize smoothly and thus did not provide a vulcanization-bonded laminate offering sufficient adhesiveness, and they exhibited interfacial delamination in the delamination test.

The epichlorohydrin rubber compositions used in Comparative Examples 6 and 7 contained all of the required compounding agents under the present invention, but by quantities greater than as specified under the present invention. As a result, these compositions provided a vulcanization-bonded laminate offering excellent adhesiveness between the two layers. However, these epichlorohydrin rubber compositions vulcanized too easily, which led to a shorter scorching time and the composition adhering to the press, resulting in poor workability.

In addition, the epichlorohydrin composition used in Comparative Example 8, which contained traditional compounding agents by large quantities, had poor workability; while the epichlorohydrin composition used in Comparative Example 9, which contained traditional compounding agents by small quantities, had poor adhesiveness. It is possible that contents of compounding agents that achieve a balance of workability and ease of handling may exist between the contents of compounding agents in Comparative Example 8 and the contents of compounding agents in Comparative Example 9. However, the physical properties of a composition containing the compounding agents by these specific quantities, and those of the vulcanization-bonded laminate obtained from this composition, should be positioned between the physical properties of Comparative Example 8 and the physical properties of Comparative Example 9, and are expected to be inferior to the physical properties of Examples 1 to 6 conforming to the present invention.

What is claimed is:

1. A rubber laminate constituted by vulcanization-bonding an epichlorohydrin rubber layer that contains at least (a) magnesium oxide, (b) polythiol vulcanizing agent, (c) at least one type of compound selected from 1,8-diazabicyclo (5,4,0) undecene-7,1,5-diazabicyclo (4,3,0) nonene-5, and salts thereof, (d) at least one type of compound selected from organic phosphonium salts and organic ammonium salts, and (e) maleic anhydride modified polybutadiene, and a fluororubber layer; said rubber laminate characterized by:

a content of the polythiol vulcanizing agent (b) in the epichlorohydrin rubber layer being 0.3 to 1.2 parts by weight per 100 parts by weight of the epichlorohydrin rubber, and a content of the maleic anhydride modified polybutadiene (e) in the epichlorohydrin rubber layer being 0.3 to 0.7 parts by weight per 100 parts by weight of the epichlorohydrin rubber, wherein the fluororubber layer is fluororubber that contains polyol vulcanizing agent.

2. A flexible hose characterized by being made of a rubber laminate according to claim 1.

\* \* \* \* \*